US012340999B2

(12) United States Patent
Stewart et al.

(10) Patent No.: US 12,340,999 B2
(45) Date of Patent: Jun. 24, 2025

(54) METHOD FOR CORRECTING MASS SPECTRAL DATA

(71) Applicant: Thermo Fisher Scientific (Bremen) GmbH, Bremen (DE)

(72) Inventors: Hamish Stewart, Bremen (DE); Bernd Hagedorn, Bremen (DE); Dmitry Grinfeld, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 282 days.

(21) Appl. No.: 18/049,314

(22) Filed: Oct. 25, 2022

(65) Prior Publication Data

US 2023/0131302 A1 Apr. 27, 2023

(30) Foreign Application Priority Data

Oct. 26, 2021 (GB) ...................................... 2115379

(51) Int. Cl.

*H01J 49/40* (2006.01)
*H01J 49/00* (2006.01)
*H01J 49/42* (2006.01)

(52) U.S. Cl.

CPC ........ *H01J 49/406* (2013.01); *H01J 49/0009* (2013.01); *H01J 49/0031* (2013.01); *H01J 49/0036* (2013.01); *H01J 49/422* (2013.01)

(58) Field of Classification Search

USPC .......................................................... 250/282
See application file for complete search history.

(56) References Cited

U.S. PATENT DOCUMENTS

| | | | | |
|---|---|---|---|---|
| 10,593,525 B2 | 3/2020 | Hock et al. | | |
| 2007/0203652 A1 | 8/2007 | Horning et al. | | |
| 2014/0306107 A1 * | 10/2014 | Remes | ................ | H01J 49/4265 250/283 |
| 2021/0287897 A1 * | 9/2021 | Lange | ................ | H01J 49/0009 |

FOREIGN PATENT DOCUMENTS

| | | | |
|---|---|---|---|
| EP | 0393891 | A2 | 10/1990 |
| JP | 2005327579 | A | 11/2005 |
| JP | 2007309661 | A | 11/2007 |
| JP | 2014507778 | A | 3/2014 |
| JP | 2021144937 | A | 9/2021 |

* cited by examiner

*Primary Examiner* — Kiet T Nguyen
(74) *Attorney, Agent, or Firm* — William R McCarthy, III

(57) ABSTRACT

A method for correcting mass spectral data obtained for a sample is described, where the mass spectral data is a time-of-flight mass spectral data. The method includes receiving mass spectral data obtained from a sample, the mass spectral data being indicative of an ion abundance. The method further includes applying a correction function to the mass spectral data based on the ion abundance indicated by the mass spectral data and on one or more trapping parameters associated with the mass spectral data. The correction function defines correction values for the mass spectral data for a range of ion abundances and for a range of trapping parameters.

22 Claims, 8 Drawing Sheets

METHOD FOR CORRECTING MASS SPECTRAL DATA

CROSS-REFERENCE TO RELATED APPLICATIONS

This application claims priority to German application no. GB2115379.6 filed Oct. 26, 2021, which disclosure is herein incorporated by reference in its entirety.

FIELD

The present disclosure relates to methods and apparatus for correcting mass spectral data. The disclosure also relates to methods and apparatus for determining correction functions for mass spectral data. More particularly, the present disclosures relate to correcting time-of-flight (TOF) mass spectral data.

BACKGROUND

Time-of-flight mass spectrometers are advantageous due to their high resolution and ability to accurately determine the mass of sample ions, generally to within 5 ppm but often to within 1 ppm or better with internal calibration. These properties lead to time-of-flight analysers, along with other high-resolution accurate-mass technologies such as orbital trapping analysers (e.g. the Orbitrap™, manufactured by Thermo Fisher Scientific™) or Fourier-Transform Ion Cyclotron Resonance (FT-ICR), being used in preference to the compact and inexpensive quadrupole and ion trap analysers for identifying analytes within complex samples.

It is known that mass measurements may be unacceptably perturbed in the presence of large numbers of analyte ions, either by space charge interactions between ions or by image charge induced upon surrounding ion optical elements. Easterling et al. demonstrated calibration and correction of FT-ICR space charge, which caused a negative shift in the ion cyclotron frequency and thus a positive shift in measured mass, as a function of the signal intensity (M. L. Easterling, T. H. Mize and I. J. Amster, *Anal. Chem.,* 1999, 71, 624-632). Similarly, Gorshkov et al. published calibration functions with similar shifts observed for the Orbitrap analyser (Gorshkov et al., *J. Am. Soc. Mass Spectrom.,* 2010, 21, 1846-1851), and Senko for linear ion traps (U.S. Pat. No. 6,884,996-B2). Most notably for time-of-flight mass spectrometry, a calibration function to correct for the positive mass shift related to the signal intensity of individual analyte peaks was proposed by Köfeler (H. C. Köfeler and M. L. Gross, *J. Am. Soc. Mass Spectrom.,* 2005, 16, 406-408) and later by Räther in U.S. Pat. No. 8,581,183-B2. Generalised observation of parameters such as space charge affecting mass peaks across many instruments, including time-of-flight analysers, and calibration strategies thereon are also made in GB-2,426,121-B.

For time-of-flight mass analysers, the intensity dependent mass shift within a peak was historically strongly impacted by saturation of the detector or data acquisition system. Time-to-digital convertors suffer from a "dead time" after each ion count when they are unable to register subsequent ion signals causing rapid saturation effects and peak shifts at high ion counts (K. Webb, T. Bristow, M. Sargent and B. Stein, *Methodology for Accurate Mass Measurement of Small Molecules*, LGC Limited, Teddington, 2004). Analog digital converters (ADCs) may accept multiple ion signals simultaneously but still suffer saturation, although improvements in bit depth and combination of multiple channels has greatly alleviated the problem. Similarly electron multipliers and particularly multi-channel plates, the most common fast detector for time-of-flight, themselves suffer strongly from saturation effects caused by electron space charge. It was thought by Rather in U.S. Pat. No. 8,581,183-B2 that such effects at the detector dominated measured ppm level mass-to-charge ratio (m/z) shifts with increasing intensity. An example of this is shown in FIG. 4 of U.S. Pat. No. 8,581,183-B2, which shows prior art measurements of m/z shift with intensity.

More recent improvements in detector technology have resulted in considerable gains in detector dynamic range, allowing simultaneous detection of thousands of ions. These include the replacement of the MCP surface with magnetic focusing from dynode surfaces U.S. Pat. No. 6,982,428-B2, U.S. Pat. No. 7,180,060-B2, and the coupling of the fast impact surface (either MCP or dynode) with space charge resilient additional gain regions, such as dynode chains or scintillator-photomultiplier tube combinations.

Many commercial time-of-flight mass spectrometry systems use orthogonal-extraction technology, where a voltage pulser extracts sections of a continuous ion beam into the analyser with a very high repetition rate of 5-30 KHz. This pulsed sampling of the beam, coupled with techniques of clipping the ion beam to ensure a match of ion spatial and energy properties to the analyser, led to time-of-flight mass spectrometry being relatively insensitive compared to methods that may analyse continuously, such as quadrupole analysis.

An important alternative to the orthogonal accelerator was the accumulation of ions within an ion trap before being directly pulse-extracted from the trap into the time-of-flight analyser (S. M. Michael, M. Chien and D. M. Lubman, *Rev. Sci. Instr.,* 1992, 63, 4277). The limited ion capacity of 3D Paul traps was addressed with use of linear elongated ion traps with a larger volume DE-19511333-C1. The ability of ion traps to accumulate from a continuous source allows high sensitivity, but coupled with 2-3 orders of magnitude slower repetition rates vs orthogonal-TOF leads to very high ion loads per shot. The worst of this may be avoided via automatic control of the ion accumulation time based on measurements of ion current (as described in, for example, U.S. Pat. No. 6,987,261-B2), but even so it is preferable for an instrument to be able to measure >1000 ions in a packet, so that an analyser operating at 100 Hz may have at least 5 orders of dynamic range.

Time-of-flight analysers achieve high resolution, and consequently mass accuracy, by ensuring that ions of the same m/z but divergent energy reach the detector at the same time. Energy focusing may be achieved by delayed extraction in the case of linear-ToF analysers, but most commonly via an ion mirror that reverses the ion trajectories ((B. A. Mamyrin, V. I. Karataev, D. V. Shmikk, and V. A. Zagulin, *Sov. Phys. JETP,* 1973, 37, 45-48). A further step was the development by Wollnik of multi-reflection ToF analysers which combine two opposing ion mirrors and allowed for a very long folded flight path whilst still maintaining focal quality, producing much higher resolution, as described in, for example, DE-3025764-C2.

An issue with such analysers is that the tightly compressed ion beam was found to suffer from strong space charge effects, including self-bunching and coalescence of adjacent m/z peaks (D. Grinfeld, A. E. Giannakopulos, I. Kopaev, A. Makarov, M. Monastyrskiy, M. Skoblin, *Eur. J. Mass Spectrom.* 2014, 20, 131-42). An improved analyser was proposed by Grinfeld and Makarov in U.S. Pat. No. 9,136,101-B2 that allows the ion packet to diverge substantially for most of its traversal through the analyser, reducing space charge effects within the analyser, before being focused spatially at the detector.

FIG. 1 shows a known ion-trap multi-reflection time-of-flight mass analyser, which is suitable for providing mass spectral data for use in embodiments of this disclosure. Ions are generated in an ion source (not shown), for instance an electrospray ion source, and transferred from the ion source, via one or more ion optical devices, preferably including a quadrupole mass filter, to a linear RF ion trap 150. Ions are accumulated, i.e. with radial and axial trapping, in the linear ion trap 150 before being extracted into the analyser by one or more pulsed DC voltages applied to the trap. A pair of deflectors 130*a* and 130*b* direct the beam into the analyser body with optimum injection angle, and a pair of lenses 140*a* and 140*b* ensure focusing in the out-of-plane dimension (e.g. the lenses may be out-of-plane lenses). Ion packets oscillate between a pair of elongated ion mirrors 110*a* and 110*b* and slowly travel down the elongated "drift" dimension, diverging according to thermal spread, or any additional lens that has been inserted, as in GB-2,580,089-A. The ion mirrors 110*a* and 110*b* are tilted to slightly converge, and serve to retard the ions' drift energy. This combines with the equal impact of stripe electrodes 120, that correct for the error in oscillation frequency induced by the mirror convergence, and cause the ions to be reflected back down the drift direction until they focus upon the detector 160. A third ion mirror is effectively created in the drift dimension as a superposition of the mirror tilt and stripe electrodes. Similar ion focusing may also be achieved through the related method of sectioning the ion mirrors instead of tilting, as described by Sudakov in WO-2008/047891.

ToF and multi-reflection-TOF (MR-ToF) analysers provide good resolution and accuracy only within a relatively fragile tolerance of initial ion conditions and applied fields. An ion trap source is very good for compressing and cooling ions to tolerable spatial and energy distributions for the analyser. However, space charge effects upon that distribution may be rather dramatic and strongly vary with the mass/charge ratio of the trapped ions.

Stewart et al., *A Rectilinear Pulsed-Extraction Ion Trap with Auxiliary Axial DC Trapping Electrodes*, Am. Soc. Mass. Spectrom. Conf. 2018, describe prior art simulations made in MASIM3D, revealing the axial and radial expansion of the trapped ion population under increasing ion numbers. In particular, FIG. 10 of Stewart et al. shows prior art simulation of the perturbation of m/z 195, 524 and 1522 ion axial and radial distributions under space charge within a linear ion trap. Notably, the higher m/z ions, which are less well focused by applied RF potentials, are forced from the central axis of the trap and form a toroidal distribution. If ejected into a time-of-flight analyser, such ions would enter with a wider energy spread, a warped energy distribution, a broader time focus, and unless the extraction field within the trap is perfectly even, a shift in average arrival time and thus the measured m/z. High ion numbers may also induce a voltage on the electrodes and perturb the extraction field.

Within a time-of-flight analyser itself, the ion mirrors are tuned to accept a wide range of incident ion energies and correct for the time-of-flight error such divergent energies create. However, the allowed error to achieve an excellent 100,000 resolution is $\sim 1\times10^{-5}$, and only over the energy spread of a single ion packet, so shifts in energy average and distribution may create ppm level mass measurement shifts.

In one study Kozlov (B. Kozlov, S. Kirillov and A. Monahov, *Analysis of Coulomb interaction effects in high resolution TOF and electrostatic FT mass spectrometers in terms of phase space rotation*, Am. Soc. Mass. Spectrom. Conf. 2012) rationalized loss of resolution observed for intense ions as a consequence of an ion packet's focal plane shifting out of alignment with the detector plane, and noted the value of stronger mirror voltages to compensate. Also known for multiple reflection analysers are self-bunching and coalescence, where similar m/z ions start to exchange energy and oscillation amplitude under space charge, and merge into a single coherent ion packet with an averaged oscillation frequency (Grinfeld et al., *International Journal of Modern Physics A,* 2019, 34, 1942007).

While some progress has been made to identify the causes of some errors in mass analysers in ToF mass spectrometry systems, there remains a need to improve the accuracy of mass spectral data.

SUMMARY

Against this background, there is provided a method for correcting mass spectral data; a method for determining a correction function for mass spectral data; and a mass spectrometry system.

The present disclosure provides methods and apparatus for improving the accuracy of ToF mass spectral data by accounting for complex mass measurement errors caused by space charge within an ion trap (e.g. a linear ion trap) associated with a ToF analyser. Such errors can be caused by high ion load within a single m/z packet, an envelope of closely spaced m/z packets, or total ion load. The disclosure recognises that known methods for correcting mass spectral data provide little rationale or explanation for how trends may be measured and corrected, and a number of possible parameters that may alter the observed trends. This disclosure recognises and provides means for accommodating the effects of various initial trapping conditions, such as Mathieu trapping parameters (q), pseudopotential well depth and thermal radius, upon space charge behaviour. Various further parameters can be accounted for. In the context of this disclosure, a correction function may be considered as a scalar field that is a function of multiple variables, and the values of the correction function may be scalar correction values that are determined based on various parameters.

Existing methods relating to ion trap—ToF mass spectrometry fail to account for the potentially substantial effects of a high concentration of ions at the point of injection (for example, the point in the ion trap from which the ions are extracted for injection into the ToF mass analyser) on mass measurement. In general terms, the disclosure relates to methods for correcting mass spectral data obtained from a sample and methods for determining such correction functions. The mass spectral data is time-of-flight mass spectral data indicative of an ion abundance that is corrected using a correction function, based on the ion abundance indicated by the mass spectral data and on one or more trapping parameters associated with the mass spectral data. Accordingly, mass spectral data having improved accuracy can be obtained.

Moreover, the disclosure provides detection of poorly trapped ions following a trend based the total ion population (for example, the total ion population in the ion trap) instead of the in-peak population. Once it is known that ions follow a trend based on total ion population (e.g. poorly trapped ions having <1.5 eV well depth with divergent space charge behaviour), it is possible to understand the likely quality of the highest m/z peaks in a mass range or to correct those peaks. The methods of the present disclosure are particularly advantageous when working with large ion packets, significantly extending the mass accurate dynamic range of apparatus.

These and other advantages will become apparent from the following disclosure.

BRIEF DESCRIPTION OF DRAWINGS

The present disclosure will now be described by way of example, with reference to the accompanying figures, in which.

DETAILED DESCRIPTION

Figure 2:
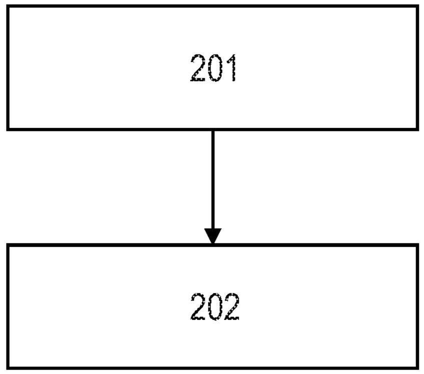
FIG. 2 shows a method for correcting mass spectral data according to a first embodiment.

In FIG. 2, there is shown a method for correcting time-of-flight mass spectral data obtained from a sample according to a first embodiment, which illustrates principles of the disclosure in a general sense. The method comprises a first step 201 of receiving mass spectral data obtained from a sample. The mass spectral data is indicative of an ion abundance. The mass spectral data may be provided by a mass analyser. For example, the mass spectral may be provided from a mass analyser to a processor configured to perform measurement correction. The mass spectral data may be provided directly from a mass analyser to a processor of a mass spectrometry system, or indirectly by transmission (e.g. over the internet) to a remote computing device for remote data processing.

The method further comprises a step 202 of applying a correction function to the mass spectral data based on the ion abundance indicated by the mass spectral data and on one or more trapping parameters associated with the mass spectral data. For instance, the one or more trapping parameters may define experimental conditions of an ion trap of the device (for example, mass analyser) used to generate the mass spectral data. The correction function defines correction values for the mass spectral data for a range of ion abundances and for a range of trapping parameters. The ranges of ion abundances and trapping parameters may be continuous ranges (or essentially continuous ranges that require interpolation) that span a large number of individual data points. In this way, the mass spectral data can be corrected so that its values are closer to the true values. In particular, the disclosure recognises that errors (e.g. due to space charge effects) in mass spectral data caused by the trapping of ions can be accounted for and removed.

Accordingly, improved mass spectral data is obtained. The correction values may be obtained from mass spectral data of a calibration sample (e.g. any known sample having known mass spectral data) for a plurality of ion abundances and for a plurality of trapping parameters. The process of obtaining the correction values may involve sweeping each parameter through a range of values while holding other parameters constant, to develop a multi-variable correction function. While a continuous sweep of each variable might be used, in many cases it is convenient and sufficiently accurate to interpolate between discrete measurements for each variable.

Figure 3:
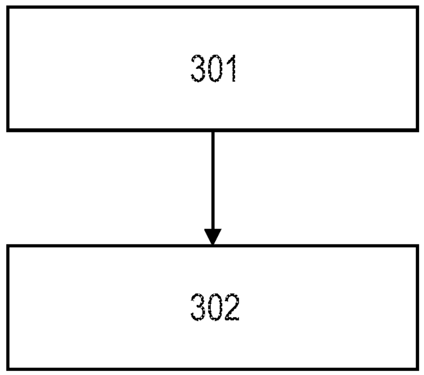
FIG. 3 shows a method for determining a correction function for mass spectral data according to a second embodiment.

In FIG. 3, a method for determining a correction function for time-of-flight mass spectral data is depicted, in accordance with a second embodiment, which also illustrates certain principles of the disclosure in a general sense. The method comprises a first step 301 of receiving mass spectral data obtained from a calibration sample. Again, the mass spectral data is indicative of an ion abundance. The calibration sample may be any sample having a known composition, so that the mass spectral data obtained from the calibration sample can be compared to its expected values. The method further comprises a step 302 of determining the correction function based on the ion abundance indicated by the mass spectral data and on one or more trapping parameters associated with the mass spectral data. The correction function defines correction values for the mass spectral data for a range (e.g. a continuous range) of ion abundances and for a range (e.g. a continuous range) of trapping parameters. The step of determining the correction function may comprise determining a measure of the difference between the mass spectral data obtained from a calibration sample and mass spectral data for the calibration sample that is known to be accurate. In this way, a correction function can be determined and used for subsequent mass spectral analysis of samples other than the calibration sample. Thus, the reliability of future mass analysis can be improved, due to the reduced impact of space charge effects caused by trapping ions.

The correction values of the correction functions described herein may be shifts, and applying the correction function to the mass spectral data may comprise adjusting the mass spectral data by at least one of the shifts. For example, applying the correction function to the time-of-flight mass spectral data may comprise adjusting a m/z value indicated by the mass spectral data by an appropriate m/z shift. For instance, the shifts may be added or subtracted to the mass spectral data. Preferably, the correction values are mass-to-charge ratio shifts for the mass spectral data.

Whilst correction functions herein are generally described as defining mass measurement shifts, it will be appreciated that mass spectral data may be a mass analyser detector signal, expressed as, for example, a voltage over time. In such cases, the correction values may be voltage shifts that allow the mass analyser detector signal voltages to be corrected. Hence, in a general sense, the mass spectral data described herein may comprise any one or more of: mass spectral data indicative of an ion count; mass spectral data indicative of a peak intensity; and/or a mass analyser detection signal (e.g. a voltage signal). Regardless of the way in which the mass spectral data is expressed, determining the correction values comprises preferably comprises determining one or more differences between the mass spectral data and known mass spectral data for the calibration sample. In particular, determining the correction values for a given ion abundance and for given trapping parameters may comprise determining one or more differences between: the mass spectral data obtained for the given ion abundance and for the given trapping parameters; and known mass spectral data for the calibration sample. This may be repeated for various ion abundances and trapping parameters, to provide a correction function that can correct mass spectral data obtained under various conditions. The differences between the mass spectral data and known mass spectral data for the calibration sample may be used as correction values of the correction function.

Figure 1:
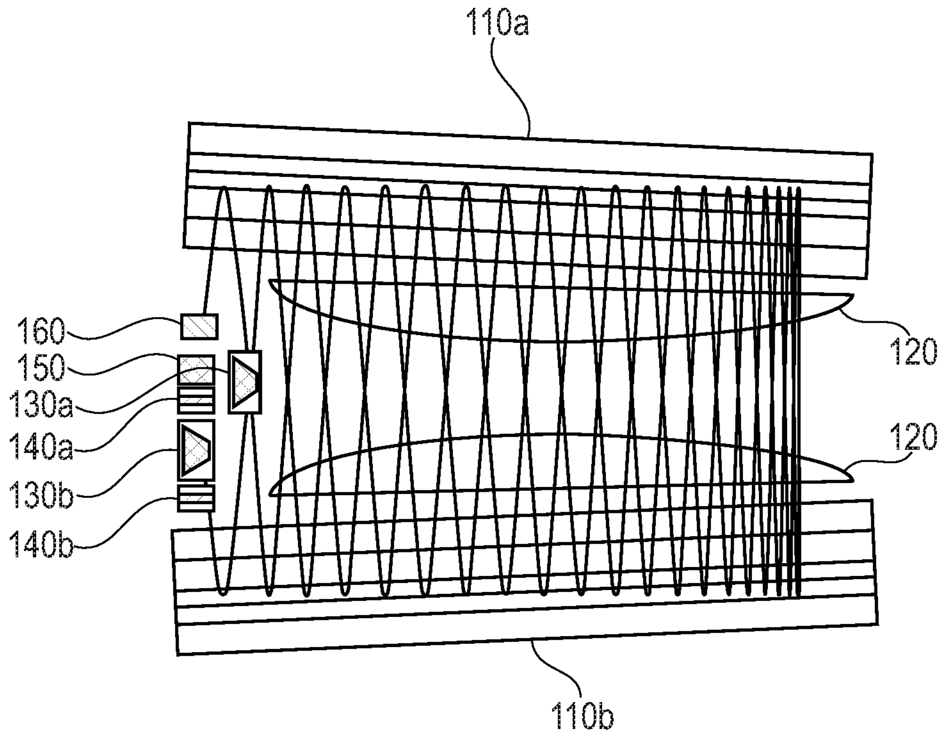
Fig. 1 (Prior art)
FIG. 1 shows a known ion-trap multi-reflection time-of-flight mass analyser.

FIGS. 4 to 13 provide details of a third embodiment of the disclosure, which is a special case of the first and second embodiments. Theoretical justifications are also provided in the description of these figures. Measurement of space charge related mass shifts within an ion-trap time-of-flight mass spectrometer with the form shown in FIG. 1 and a 23-metre flight path reveals substantial complexity in the observable trends. The disclosure recognises that space charge effects occurring in the analyser are related to the initial charge density of ions stored within the RF ion trap 150, as these map to the charge density of ions in the analyser itself. Thus, embodiments of the disclosure recognise that improved mass spectral data can be achieved by determining appropriate correction functions and applying such functions to experimental data.

The properties of trapped ions are commonly described according to the Matthieu trapping parameter q, a product of the trap's inscribed radius $r_0$, the applied RF voltage amplitude V and frequency F, and the ion's mass m and charge z:

$$q = \frac{4zV}{m(2\pi F)^2 r_0^2}$$

Notably, the Matthieu trapping parameter is inversely proportional to m/z. For the purposes of determining the correction functions described herein, one can assume a value of q from uncorrected mass/time measurements, since ppm level errors in determining q will not significantly affect the correction. From this calculation of q, the depth of the pseudopotential well φ may be calculated, and the radius of the trap occupied by ions with room temperature thermal kinetic energy (~0.025 eV RMS), the so-called thermal radius, $r_t$ estimated:

$$\varphi = \frac{Vq}{4}$$

$$r_t = r_0\sqrt{\frac{0.025}{2\varphi}}$$

If the trapping region length L is known, or approximated to be constant, the initial charge density ρ of a detected ion packet with N ions may be calculated:

$$\rho = \frac{N}{\pi r_t^2 L}$$

Figure 4:
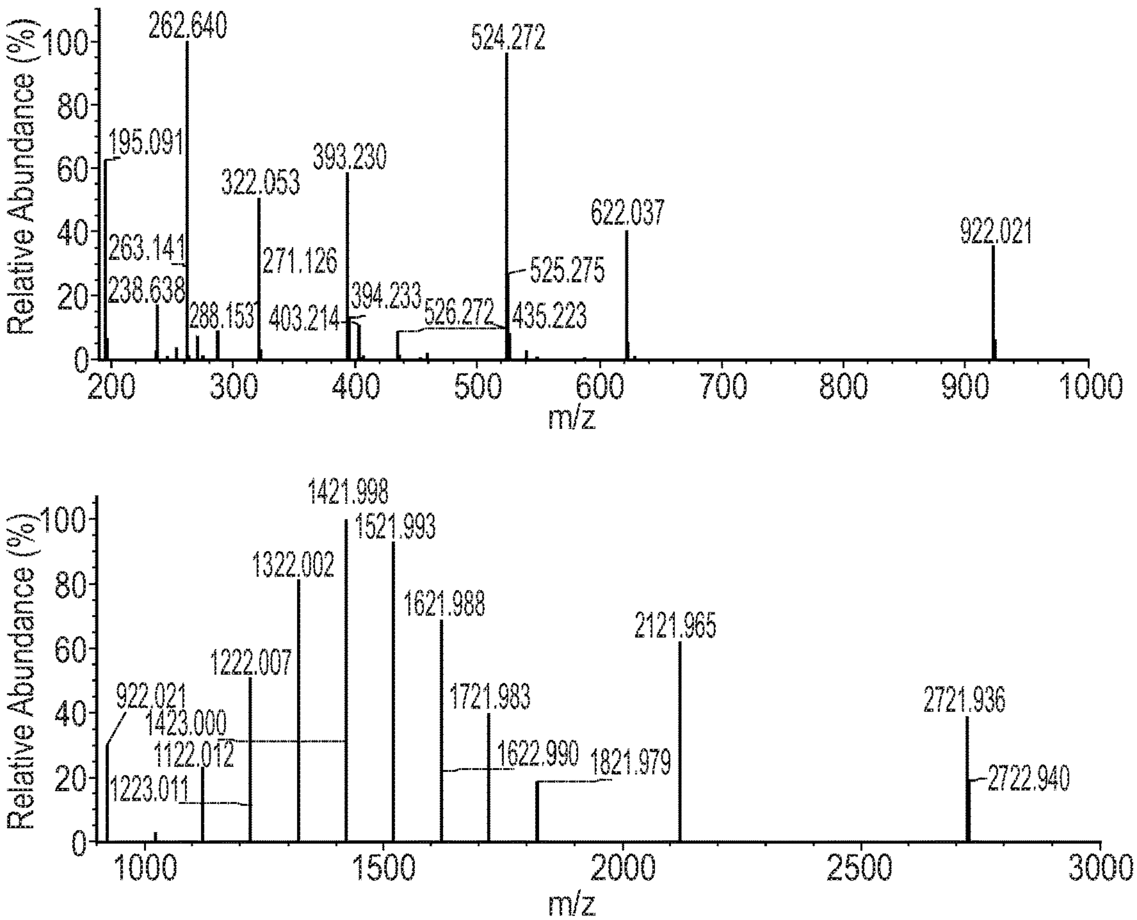
FIG. 4 shows mass spectral data suitable for determining the correction functions of the first and second embodiments.

In this disclosure, measurements of mass shift are made and described by infusing Pierce™ FlexMix™ Calibration Solution (which is a mixture of 16 highly pure, ionisable components having mass ranges from 50 to 3000 m/z, designed for both positive and negative ionization calibration) either with broad m/z ranges 190-1000, 900-3000, or single m/z ions isolated by quadrupole mass filter. The distributions of ions within this sample are shown by the mass spectra in FIG. 4. FIG. 4 shows broad m/z ranges of Pierce FlexMix calibration solution. It will be appreciated that various other calibration samples can be used.

Ion population was varied by scanning the fill time that the ion trap accumulated ions generated from an electrospray ion source. Various other properties of the ion trap and analyser were investigated, most particularly the amplitude of the applied RF voltage, to affect ion spatial distributions.

Figure 5:
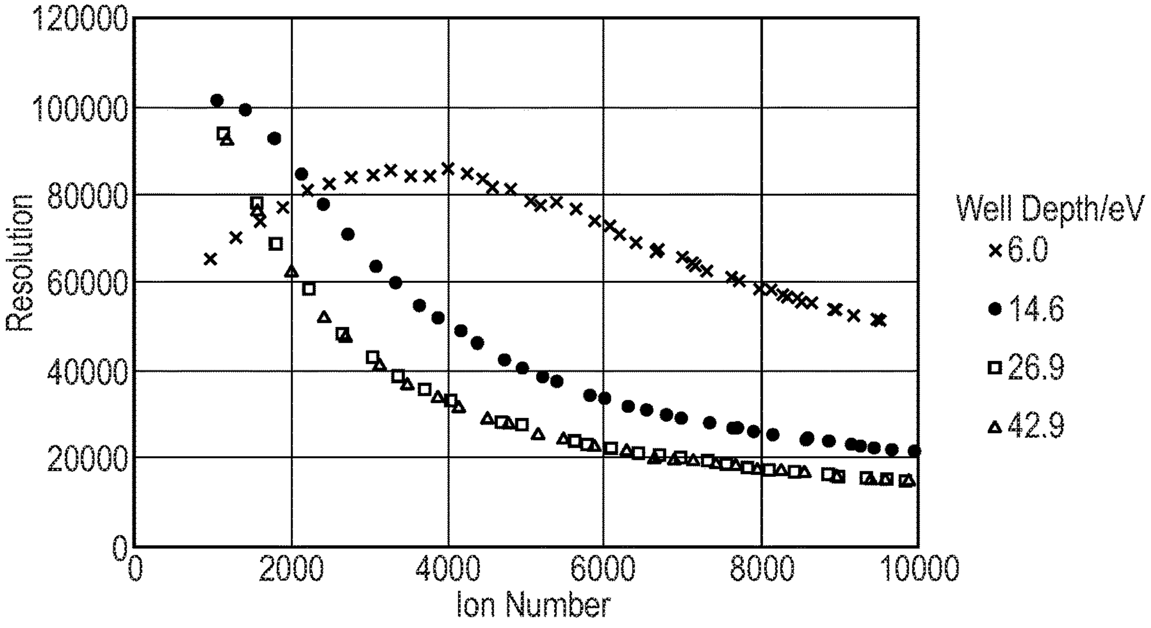
FIG. 5 shows the effects on mass resolution caused by ion number for different pseudopotential well depths.

Loss of resolution with increasing number of ions in peak is a known matter that is not directly addressed by embodiments of this disclosure. It is however important for understanding of space charge effects, and any solution to average mass measurement that greatly compromises resolution is not viable since the precision of the measurement is depends on resolution, along with the square root of the number of ions. FIG. 5 shows the resolution shift with ion number for the MRFA peptide at m/z 524 within a FlexMix infusion of m/z range 190-1000, for several different pseudopotential well depths, altered by scanning RF amplitude. It can be seen that for the deeper well depths, with more tightly focused ions, the resilience to the impact of space charge on resolution is reduced. Of particular interest is the measurement where the well depth was a rather weak 6 eV, and the low ion number resolution was compromised, as shown by the resolutions at 6 eV and low ion numbers being below those of the other well depths. This closely resembles the pattern that forms when mirror voltages are strengthened, and so is thought likely a consequence of the focal plane at low space charge shifting beyond the tuning point of the mirrors.

Figure 6:
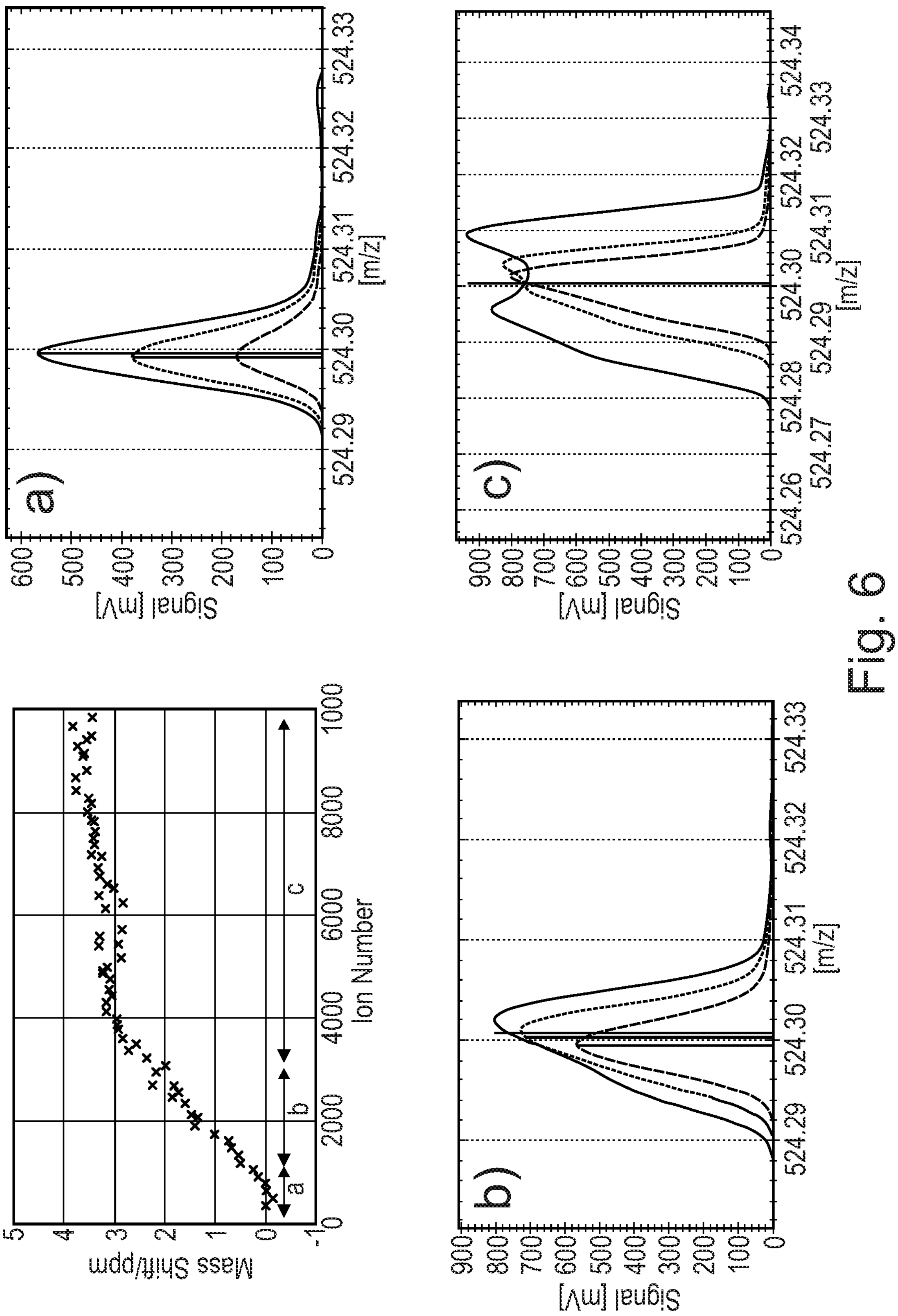
FIG. 6 shows measured mass shifts due to space charge effects and corresponding effects on peak shape.

The trend of mass measurement shift with increasing ion number for isolated ions of m/z 524 is shown in the top left quadrant of FIG. 6, along with the changing peak shapes in the bottom left quadrant and the right hand side of FIG. 6. It can be seen that after a narrow stable region (denoted region a) ending below 1000 ions in a peak, for example in which there is substantially no mass shift, the peaks broaden and become increasingly asymmetric, resulting in a shift in the measured mass (in the region denoted b). This rise slows and halts almost completely at 4000 ions and above (denoted region c), whilst the peak shape continues to broaden and gains some bimodal character. Thus, FIG. 6 demonstrates mass shifts due to space charge of isolated m/z 524 ions, with corresponding influence upon peak shape in a stable low intensity region a, a rapid mass shift and asymmetric region b, and a stabilised high intensity region c. It is notable that the stable low intensity region a is narrower (i.e. spans a lower range of ion abundances) than the rapid mass shift and asymmetric region b and the stabilised high intensity region c. In the generalised language used in this disclosure, the first range of ion abundances may be narrower than the second and/or the third range of ion abundances.

Returning to the general terms used previously, FIGS. 4 to 6 are illustrative of a method of determining the correction values for a given ion abundance and for given trapping parameters. The method comprises determining one or more differences between: the mass spectral data obtained for the given ion abundance and for the given trapping parameters; and known mass spectral data for the calibration sample (in this case, Pierce FlexMix solution). The trapping parameters may comprise any one or more of: an applied trapping voltage; an applied RF frequency; an ion mass-to-charge ratio; a pseudopotential well depth, φ; a Matthieu trapping parameter (q); a thermal radius of ions associated with the mass spectral data; and a radius, $r_0$, inscribed by a trap.

The origin of these errors is not well understood theoretically and poorly matches simulations of space charge effects, at least for optimised systems. It is possible that self-bunching occurs at several thousand ions and may be the reason for the stabilisation of mass measurement at high ion number. The precise nature of the shifts in mass caused by widening energy distributions under space charge is not at all obvious. Saturation of detector was ruled out via replication of the experiment at lowered gain. Nevertheless, such a pattern can be measured and corrected. While various types of correction function can be used, a logistic function with appropriate parameters is suitable for replicating such an S-shaped curve.

An example correction function f(x), which defines m/z correction values f(x) at an ion abundance of x, in which a, c, d and f are fitting parameters that are related to experimental conditions, is given below:

$$f(x) = \frac{a}{1 + ce^{-dx-f}}$$

Other sigmoid functions could be used to fit a correction function, and even polynomials or linear fits with controlled start and end points (e.g. defined as a piecewise function) could be used to correct for observed shifts. In general terms, the correction function may be any one or more of: a sigmoid fit; a logistic function fit; a polynomial fit; and a piecewise linear fit. In many experimental setups, the correction function may be monotonically non-decreasing (or monotonically increasing) with increasing ion abundance. This reflects the trend shown in FIG. 6, in which a first stable region at low abundance (region a) is followed by a second stable region (region c) at high ion abundance, with a linear region (region b, which may be termed a third region) between the first and second regions.

The stable region at low abundance (region a) may be induced by the tuning of mirrors, but it can also be removed or even reversed to a negative trend. Thus, under certain conditions, there may be no first region (or equivalently, the first region may have zero width), with there being only a linear region (e.g. region b, or the trend shown in FIG. 8) and a stable region at high abundances (e.g. region c). The correction function may be: substantially constant (e.g. in the first region, a, and/or the second region, c); and/or substantially linearly increasing (e.g. in the third region, b) with increasing ion abundance, for at least one range of ion abundances. The correction function may alternatively be constant and/or linearly increasing with increasing ion abundance, for at least one range of ion abundances.

In generalised terms, the correction function may define correction values for the mass spectral data for a first range of ion abundances and for a second range of ion abundances. A gradient of the correction function may be constant or substantially constant with respect to ion abundance for the first range of ion abundances and/or the second range of ion abundances. Preferably, the correction function is zero or substantially zero for the first range of ion abundances (although, as noted previously, a negative trend could be induced in the first range); and/or the correction function is non-zero (e.g. a positive constant measurement error at high abundances in region c) for the second range of ion abundances. The correction function may also define correction values for a third range of ion abundances, the third range of ion abundances being between the first range of ion abundances and the second range of ion abundances. Thus, for example, the first range may be from 0 to a first ion abundance; the second range may be from the first ion abundance to a second ion abundance; and the third range may be the range above the second ion abundance.

A gradient of the correction function with respect to ion abundance may be greater in the third range of ion abundances than in: the first range of ion abundances; and/or the second range of ion abundances. Preferably, the correction function may be linearly increasing or substantially linearly increasing (e.g. it may have an approximately constant, positive gradient) with increasing ion abundance in the third range of ion abundances. The first range of ion abundances may be lower (i.e. span a range of relatively low ion abundances) than the second range of ion abundances and/or the third range of ion abundances. In any event, in many embodiments of the disclosure, a gradient of the correction function with respect to ion abundance decreases with increasing ion abundance, at least at high ion counts (although there may be a decrease or no appreciable increase in the gradient at low ion counts). This reflects the realisation that at high ion abundances, stabilisation of mass measurement at high ion number often occurs, which may be due to self-bunching occurring at high ion counts.

Figure 7:
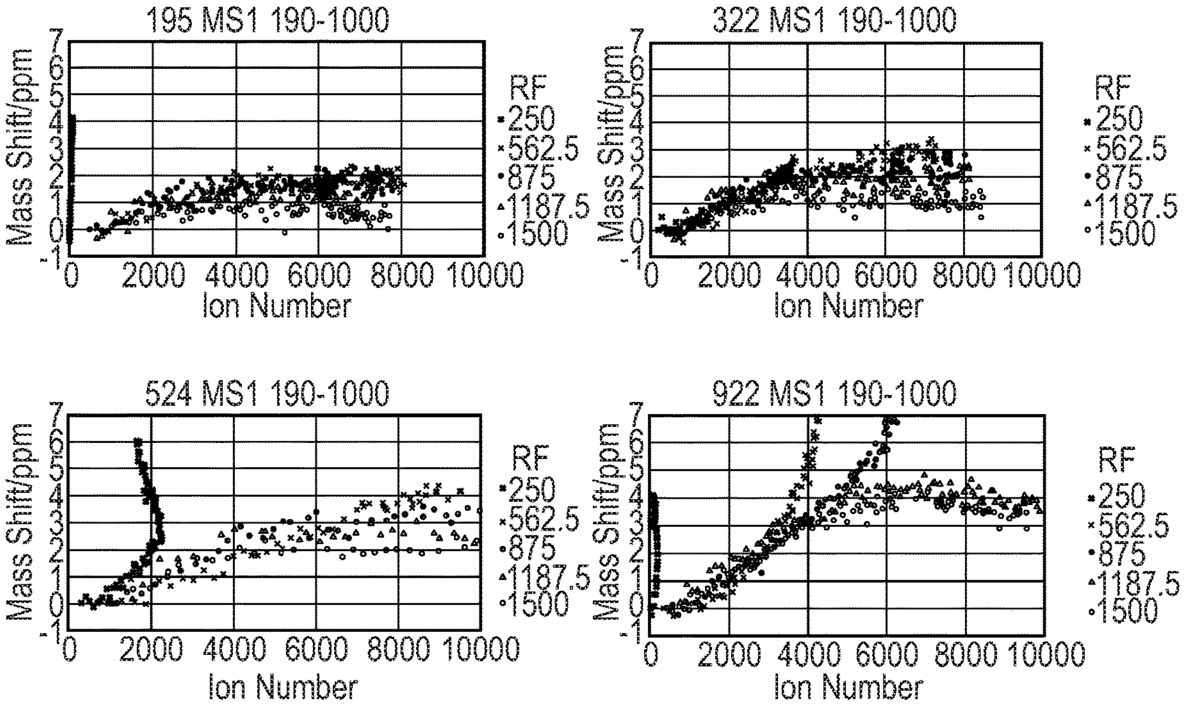
FIG. 7 shows measured mass shifts for different ion loads and trap RF amplitudes.

While the above correction function f(x) can be used to improve the quality of mass spectral data, no single set of parameters (a, c, d, and f) can be used for all ions under all conditions. FIG. 7 shows m/z shift trends measured for several Pierce FlexMix ions injected together at differing trapping RF levels. In particular, FIG. 7 shows differing m/z shift trends for co-injected Pierce FlexMix ions m/z 190-1000 at different ion loads and trap RF amplitudes (in Volts) without any correction being applied. It can be seen that there are both m/z-related effects and RF-related effects. Generally, high trapping RF amplitude causes the levelling off of m/z to occur at a lower total ion number, consistent with the idea that increased initial charge density under stronger trapping RF causes self-bunching to occur earlier. It is however apparent that isolated ions, which should be most tightly RF focused, reached a ~25% higher mass shift before levelling off.

Figure 8:
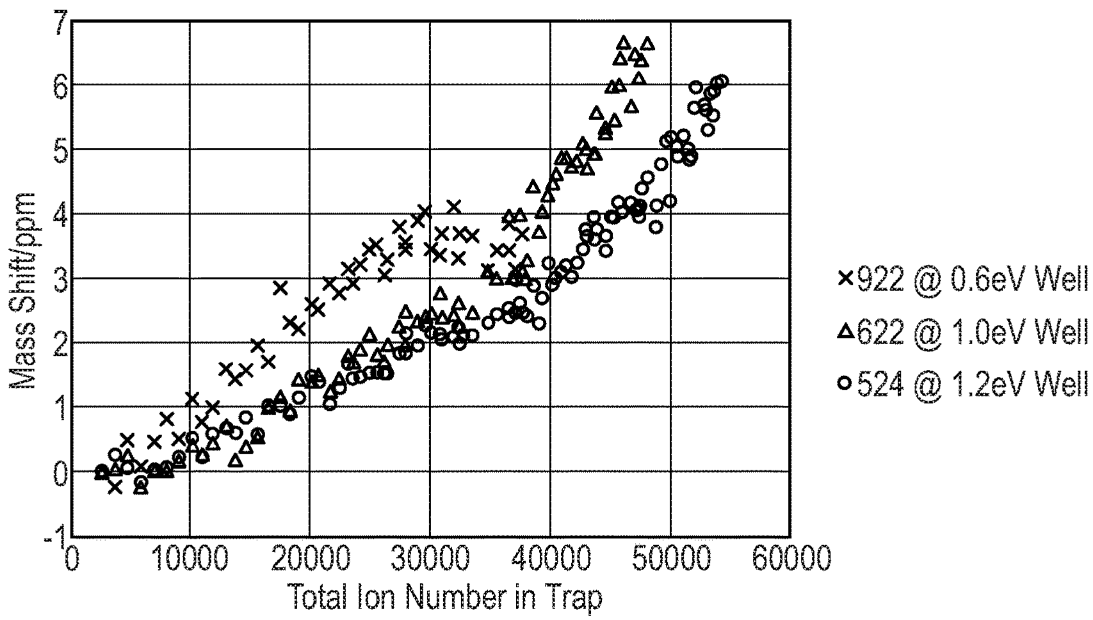
FIG. 8 shows measured mass shifts for weakly trapped ions.

Another observation is that at low trapping RF amplitude, weakly trapped ions follow a different m/z shift behaviour completely and seem to track the total ion population in the ion trap. These ions suffer most strongly from space charge effects within the trap, and the effect seems to occur when the pseudopotential well depth is approximately <1.5 eV. Several example m/z ions are plotted against total ion population in FIG. 8. In particular, FIG. 8 shows mass shift trends of weakly trapped ions (<1.5 eV pseudopotential well depth) against total trapped ion population. In view of the effects observed in FIG. 8, correction functions can be defined that include a rule to flag such poorly trapped m/z ions and/or to correct the measurements made on such ions according to this alternative trend. The alternative trend shown in FIG. 8 is substantially linear. Therefore, a linear approximation to this trend can be provided. Nevertheless, the trend in FIG. 8 is not perfectly linear and so a polynomial (or other non-linear) fit can be used. Approximating the trend of FIG. 8 as a linear trend limits the range over which the correction can provide a workable solution, while a polynomial correction could of course be used and would be accurate across a wider range of ion numbers.

Hence, in a general sense, the correction functions described herein (e.g. the function determined from FIG. 6) may be for a range of trapping parameters that is a first range of trapping parameters defining a first trapping regime in which the correction function has a first form. A second range of trapping parameters may define a second trapping regime in which the correction function has a second form (e.g. the form shown in FIG. 8). Ions are preferably more strongly trapped (e.g. confined to a smaller volume, due to the applied frequencies, volumes, etc.) in the first trapping regime than in the second trapping regime. The first form of the correction function may be different to the second form of the correction function. For instance, the first form of the correction function may be given by f(x), or be as described with reference to FIG. 6. Additionally or alternatively, the second form of the correction function may be substantially linearly increasing with increasing ion abundance.

The correction function may be based (at least in part) on total ion population in the trap. The correction function may be based on total ion population only in a particular trapping regime (e.g. the second trapping regime), or it may always take account of total ion population. Preferably, the second form of the correction function (i.e. the correction function in weak trapping conditions) is based on total ion population. It has been observed that total ion population effects dominate measurement errors in weak trapping conditions. Thus, taking total ion population into account when determining correction values (at least in the weak trapping regime) can provide improved mass spectral data.

The methods described herein may comprise determining that the one or more trapping parameters associated with the mass spectral data and/or the mass spectral data are indicative of ions trapped in a second trapping regime. For instance, it may be apparent that ions are weakly trapped from the mass spectral data or from the trapping parameters associated with the mass spectral data. Thus, the methods described herein may therefore also comprise determining a second form of the correction function for the mass spectral data based on: the one or more trapping parameters associated with the mass spectral data being indicative of ions trapped in the second trapping regime; and/or the mass spectral data being indicative of ions trapped in the second trapping regime. When the correction function has been determined and is to be used for correction of mass spectral data, the methods described herein may comprise applying the second form of the correction function to the mass spectral data based on: the one or more trapping parameters associated with the mass spectral data being indicative of ions trapped in the second trapping regime; and/or the mass spectral data being indicative of ions trapped in the second trapping regime. Consequently, mass spectral data for both strongly- and weakly-trapped ions can be corrected. The correction functions described herein can be extended to additional regimes defined by other ranges of trapping parameters (or any other experimental conditions).

Figure 9:
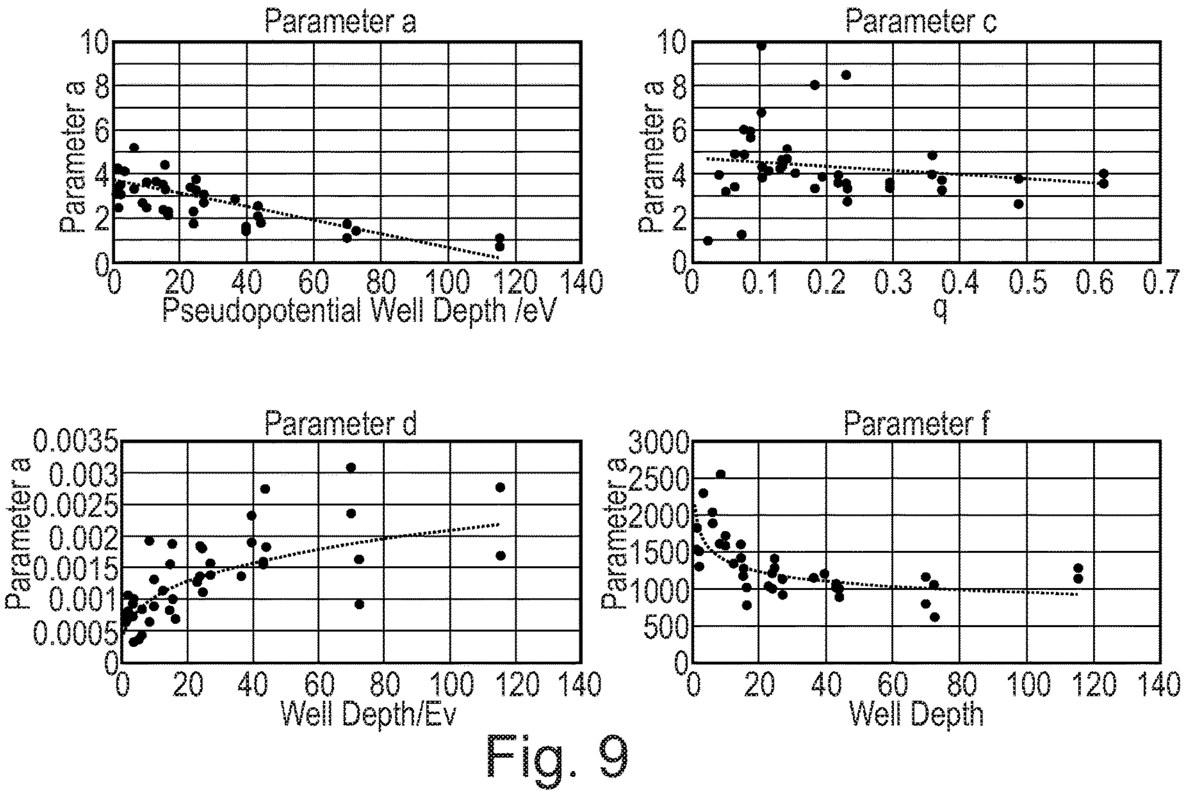
FIG. 9 shows fitting parameters of correction function for mass spectral data.

As mentioned, each m/z trend in FIG. 7 fits to slightly different parameters (e.g. the parameters a, c, d and f in the above sigmoid function f(x)). These parameters are themselves at least weakly based on trends relating to the trapping conditions q, well depth φ and thermal radius. FIG. 9 shows plots for a series of fitting parameters of the aforementioned logistic fit. Parameters a, d and f follow quite strong trends with pseudopotential well depth, though c is relatively flat. Thus, in generalised terms, a, c, d and f may be considered to be based on trapping parameters. Accordingly, the correction functions described herein are functions of trapping parameters.

Figure 10:
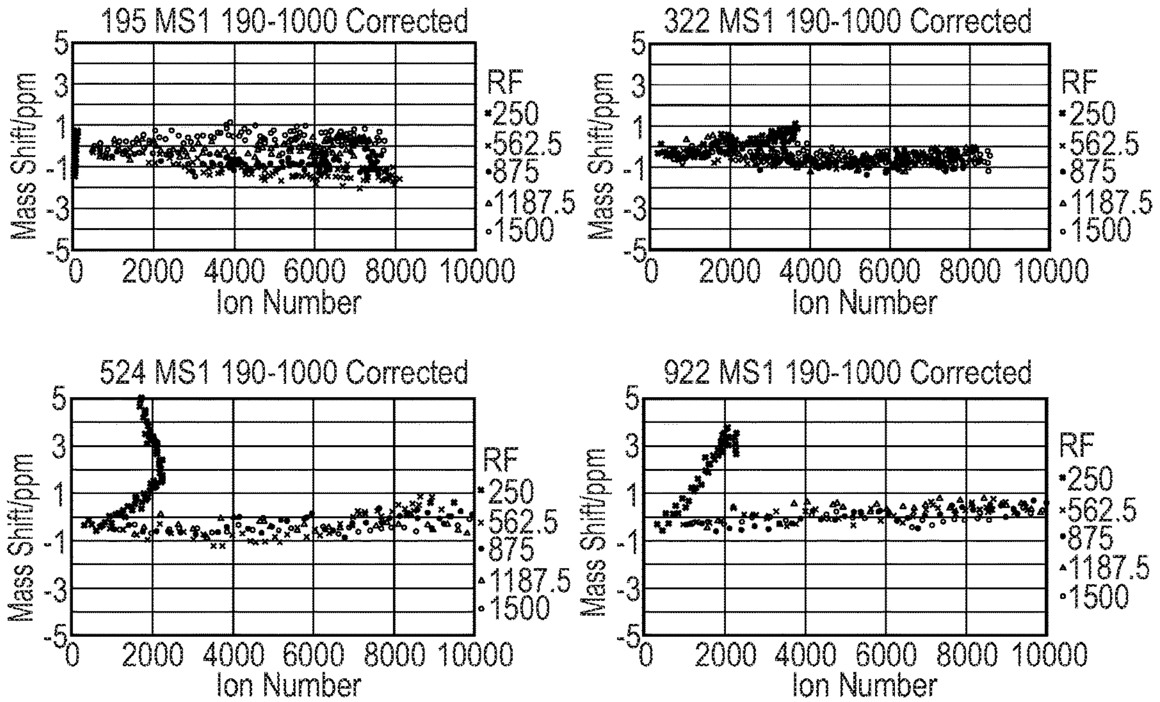
FIG. 10 shows the data of FIG. 7 for m/z of from 190 to 1000 corrected using the correction function of FIG. 9.

It is then possible to use these fits to correct for the mass shifts. FIG. 10 shows the results of applying the logistic correction function to ion mass measurements from the RF/FlexMix ion population scan of FIG. 7. Thus, FIG. 10 shows differing m/z shift trends for co-injected Pierce FlexMix ions m/z 190-1000 at different ion loads and trap RF amplitudes after a correction is applied. It can be seen that the <1 ppm error region is greatly enhanced, with the exception of the very weakly bound ions at 250V RF, which follow the total ion population more than the population of ions of like m/z.

Figure 11:
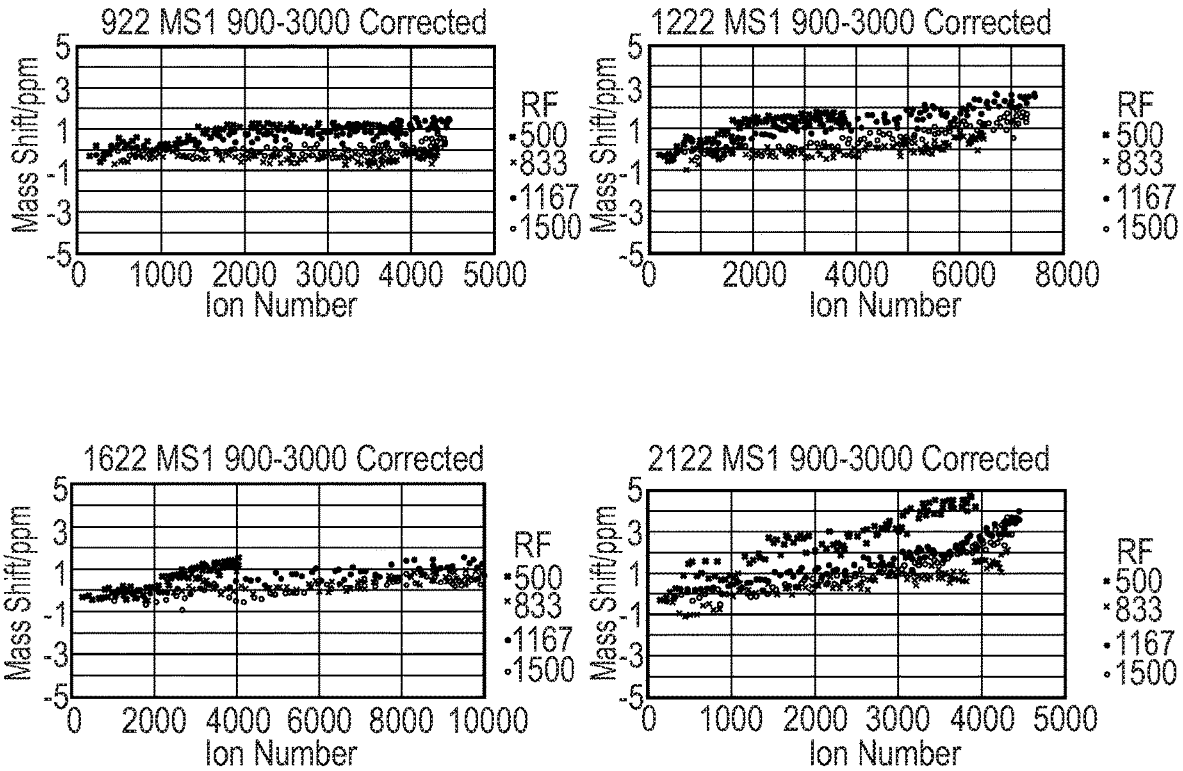
FIG. 11 shows data with m/z of from 900 to 3000 corrected using the correction function of FIG. 9.

To further demonstrate the advantageous effects of this fitting, the same parameters were applied to a second large scan of RF amplitude and FlexMix ion population, but for a very different m/z range of 900-3000. The corrected results are shown in FIG. 11, where it can be seen that performance is somewhat weaker, particularly for relatively weakly trapped high m/z low RF ions, although there is still an improvement over the uncorrected data. Normally at this mass range only 1500V RF or greater would be used in practice, and generally the correction is a significant improvement, which greatly extends the range at which ion measurement mass stays within 1 ppm.

Ion charge state also affects the reliability of mass spectral data. It is known that high charge state ions have lower velocity under thermal energy than singly charged ions of like m/z. This means that they spread out less within the ToF analyser and thus have a higher charge density. Accordingly, the disclosure accounts for the stronger space charge effects that arise. Higher charge state ions also have increasingly closely packed isotopes, giving a corresponding increasing probability of coalescence effects.

Figure 12:
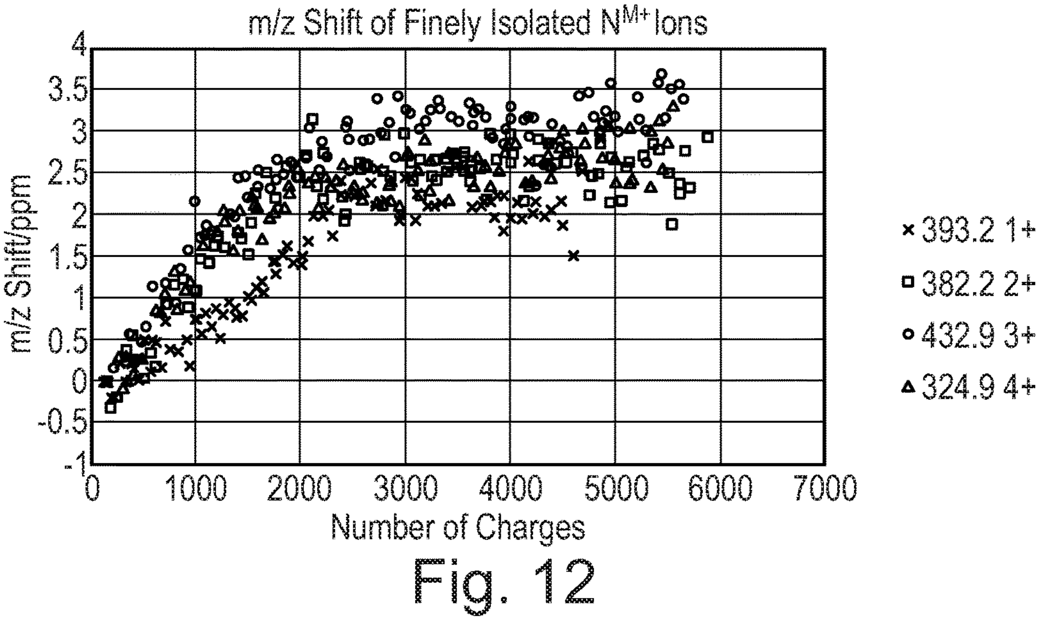
FIG. 12 shows m/z shift trends and charge states for finely isolated ions.

At low ion numbers for the analyser, ions up to 4+ still behave in a roughly similar manner. A sample of angiotensin, which produces ions up to charge state 4+, was measured and the mass shifts of different charge states compared to that of the nearest singly charged FlexMix m/z in FIG. 12, which shows m/z shift trends and charge state for finely isolated ions. In the notation $N^{M+}$ in FIG. 12, N is used to denote different m/z values for ions (i.e. the different ion m/z values in the legend on the right hand side) and M+ denotes differing charge states for those ions. FIG. 12 would be expected to show the same overall trends as FIG. 6 (e.g. having a measurement error that becomes stable with increasing ion abundance). Nevertheless, the stable, low ion count region a in FIG. 6 is not apparent in FIG. 12, and is essentially of zero width. This is because this flat region may be induced by the tuning of mirrors (it can be removed or even reversed to a temporary negative trend), and was weaker in this experiment. It can be seen that the multiply charged ions behave in an approximately similar manner, though the singly charged control group exhibited a greater tolerance to space charge.

In order for correction based on charge state to work, a charge state is first assigned (e.g. by the mass spectrometer) so that the number of charges may correctly be estimated. Hence, returning to the general sense described previously, the correction functions described herein may define correction values for a range of charge states and the methods described herein may further comprises: determining a charge state of the mass spectral data; and applying the correction function to the mass spectral data based on the determined charge state. When the corrections functions are being determined, the methods described herein may comprise: determining a charge state of the mass spectral data; and determining the correction function for the mass spectral data based on the determined charge state. Charge state determination can be performed using algorithms known in the art like THRASH (Thorough High Resolution Analysis of Spectra by Horn) and Thermo Fisher Scientific's APD (Advanced Peak Determination) to determine charge state. Generally, one can look at the mass spacing between isotopes (e.g. a singly-charged +1 Da isotope would show twice as much m/z spacing as doubly-charged +1 Da isotope), or look for other charge states of the same ion and measure the mass difference.

Figure 13:
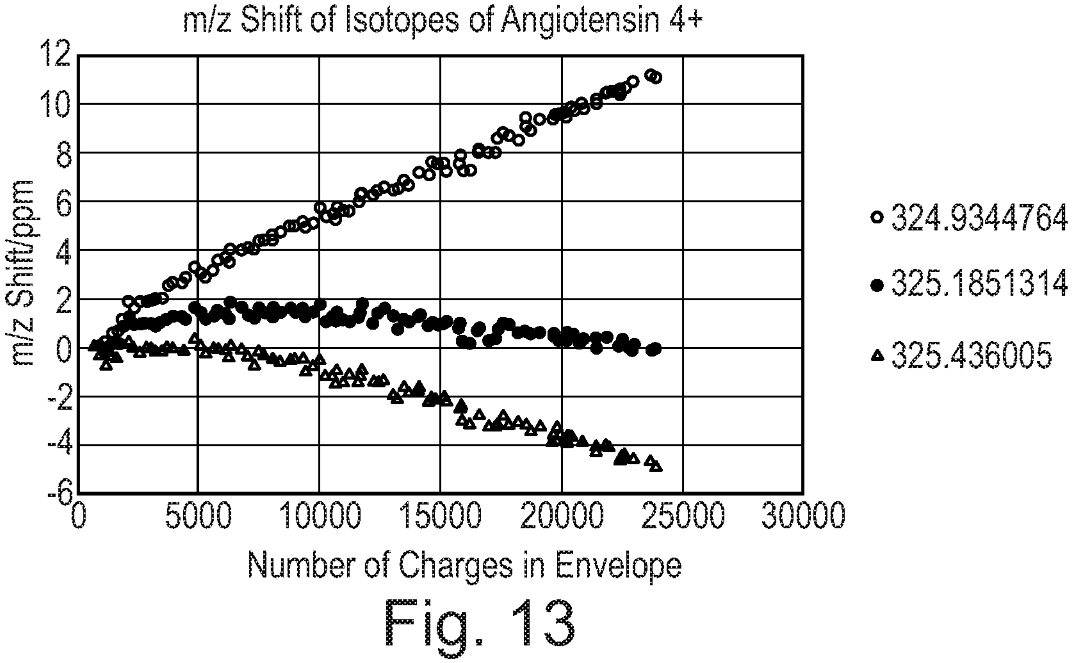
FIG. 13 shows m/z shift trends for isotopes of the 4+ angiotensin.

When not isotopically isolated, multiply charged ions exhibit much greater drift, which is thought to be due to coalescence between the isotopes of the multiply charged ions. FIG. 13 shows the onset of coalescence between Angiotensin m/z 325 4+ isotopes, whereby higher mass isotopes of the 4+ angiotensin ion are pulled to lower m/z by the first isotope. This is occurring only at a large number of charges, so it is not anticipated to be necessary to compensate for in normal circumstances. Nevertheless, it is straightforward to adjust the fitting parameters (e.g. a, c, d and f) in a charge state-dependent fashion suitable for the first isotope. Middle isotopes may also be used to better determine mass, being less dependent on coalescence, although at high charge states it is anticipated that some proportion of charge from the entire envelope will also contribute to the m/z shift. For instance, middle isotopes may be defined as being within the middle 50%, 40%, 30%, 20% or 10% of observable isotopes. Therefore, where the isotopes of a species span, for example, a range of 10 Da, the middle isotopes might be defined as the isotopes having masses in the middle 5 Da of that range.

As noted previously, in mass spectrometers there is often a global effect on mass shift caused by the total ion population. The effect was only strongly observed here for very weakly trapped ions (e.g. poorly trapped ions having <1.5 eV well depth with divergent space charge behaviour), and a more subtle underlying effect for well trapped m/z was not clearly observed, but may still be found in similar systems and is easily correctible.

Also provided herein is a mass spectrometry system comprising: a time-of-flight mass spectrometer (e.g. of the type shown in FIG. 1) configured to provide mass spectral data obtained from a sample; and a correction unit. The correction unit may be configured to correct the mass spectral data using any of the methods described herein. Additionally or alternatively, the correction unit may be configured to determine a correction function for the mass spectral data using the methods described herein. The correction unit may comprise a processor, for example a processor having logic for correcting the mass spectral data using any of the methods described herein and/or logic for determining a correction function for the mass spectral data using the methods described herein. The mass spectrometry system may comprise an ion trap and/or the mass spectrometry system may be a multi-reflection time-of-flight mass spectrometry system and/or the mass spectrometry system may be an ion-trap/reflectron-ToF instrument. An advantageous mass spectrometry system is a multi-reflection time-of-flight mass spectrometry system comprising an ion trap. The ion trap may be arranged for accumulating ions and injecting the accumulated ions directly into a time-of-flight mass analyser, such as a multi-reflection time-of-flight mass analyser, or the ion trap may be arranged for accumulating ions and releasing the accumulated ions to an orthogonal accelerator for injecting ions into a time-of-flight mass analyser, such as a multi-reflection time-of-flight mass analyser. The ion trap may be a linear RF ion trap (for instance a rectilinear ion trap or a curved linear ion trap (C-trap), which can be a linear RF quadrupole ion trap), a multipole ion trap, which can be a quadrupole ion trap, a Penning trap, which forms a potential via a combination of electric and magnetic fields, and/or a Paul trap which forms a potential via a combination of static and oscillating electric fields. Various other traps can be used. In any event, such mass spectrometry systems may be capable of providing higher quality mass spectral data than known systems. The time-of-flight mass analyser may comprise one or more, preferably two or more, ion mirrors. The multi-reflection time-of-flight mass analyser may comprise a pair of elongated ion mirrors between which ions oscillate while moving in a drift dimension that is in the direction of elongation of the mirrors. The pair of elongated ion mirrors may be parallel or tilted to each other. The time-of-flight mass analyser may have a multi-turn ion path, for example a loop or figure of eight ion path. Modern orthogonal ToFs often incorporate a trapping stage in a cell immediately prior to the orthogonal accelerator, which can be considered a form of ion trap-ToF, albeit with a right angle in the flight path. Embodiments of the present disclosure can be implemented in such orthogonal ToF systems.

It will be appreciated that embodiments of the disclosure may be implemented using a variety of different information processing systems. In particular, although the figures and the discussion thereof provide exemplary computing systems and methods, these are presented merely to provide a useful reference in discussing various aspects of the disclosure. Embodiments may be carried out on any suitable data processing device, such as a personal computer, laptop, personal digital assistant, server computer, etc. Of course, the description of the systems and methods has been simplified for purposes of discussion, and they are just one of many different types of systems and methods that may be used. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules. Moreover, multiple method steps implemented in flowcharts contained herein, or as described above, may be implemented together by a single module.

It will be appreciated that, insofar as embodiments of the disclosure are implemented by a computer program, then a storage medium and a transmission medium carrying the computer program form aspects of the disclosure. The computer program may have one or more program instructions, or program code, that, when executed by a computer, causes an embodiment of the disclosure to be carried out. The term "program", as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

Moreover, a number of variations to the described embodiments can be made and will be apparent to a skilled reader upon reading this specification. For instance, the parameters of the correction functions described herein will vary depending on the particular setup. The parameters would be expected to vary greatly depending on instrument size, ion trap size, ToF analyser structure, tuning and applied RFs, etc. For example, if the trap doubles in width, then initial charge density drops by a factor of 4, and one might anticipate a corresponding 4× improvement in tolerance to space charge. Nevertheless, the process of determining an appropriate correction function using a calibration sample can be implemented for any setup. In a table-top sized MR-ToF analyser, when resolution is tuned to hold acceptably to 1000 ions, the "stable" first region (region a of FIG. 6) also holds to about this level, and this holds true across the mass range (but may change when multiply charged ions are input). The flattening off at high ion count (e.g. region c of FIG. 6) typically occurs at 2000-6000 ions, although the precise value will depend on the experimental conditions.

In the context of this disclosure, trends are described as being substantially zero, substantially constant, or substantially linear. This may be taken as meaning that the trend is sufficiently close to being zero, constant, or linear to allow effective correction of mass spectral data (e.g. to within 5 ppm or 2 ppm, or most preferably to within 1 ppm accuracy after correction).

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as an ion or a trapping parameter) means "one or more" (for instance, one or more ions, or one or more trapping parameters). Throughout the description and claims of this disclosure, the words "comprise", "including", "having" and "contain" and variations of the words, for example "comprising" and "comprises" or similar, mean that the described feature includes the additional features that follow, and are not intended to (and do not) exclude the presence of other components. Moreover, where a first feature is described as being "based on" a second feature, this may mean that the first feature is wholly based on the second feature, or that the first feature is based at least in part on the second feature.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

What is claimed is:

1. A method for correcting mass spectral data obtained from a sample, wherein the mass spectral data is time-of-flight mass spectral data, the method comprising:

receiving the mass spectral data obtained from the sample, the mass spectral data being indicative of an ion abundance; and applying a correction function to the mass spectral data based on the ion abundance indicated by the mass spectral data and on one or more trapping parameters associated with the mass spectral data, the correction function defining correction values for the mass spectral data, for a range of ion abundances, and for a range of trapping parameters.

2. The method of claim 1, wherein the correction values are shifts and wherein applying the correction function to the mass spectral data comprises adjusting the mass spectral data by at least one of the shifts, preferably wherein the correction values are mass-to-charge ratio shifts for the mass spectral data.

3. The method of claim 1, wherein the correction values are obtained from mass spectral data of a calibration sample for a plurality of ion abundances and for a plurality of trapping parameters.

4. The method of claim 1, further comprising:

determining that: the one or more trapping parameters associated with the mass spectral data; and/or the mass spectral data are indicative of ions trapped in a second trapping regime; and/or applying a second form of the correction function to the mass spectral data based on: the one or more trapping parameters associated with the mass spectral data being indicative of ions trapped in the second trapping regime; and/or the mass spectral data being indicative of ions trapped in the second trapping regime.

5. The method of claim 1, wherein the correction function defines correction values for a range of charge states and the method further comprises:

determining a charge state of the mass spectral data; and applying the correction function to the mass spectral data based on the determined charge state.

6. The method of claim 1, wherein the trapping parameters comprise any one or more of: an applied trapping voltage; an applied RF frequency; an ion mass-to-charge ratio; a pseudopotential well depth, φ; a Matthieu trapping parameter; a thermal radius of ions associated with the mass spectral data; and a radius, $r_0$, inscribed by a trap.

7. The method of claim 1, wherein a gradient of the correction function with respect to ion abundance decreases with increasing ion abundance.

8. The method of claim 1, wherein the correction function is substantially constant and/or substantially linearly increasing with increasing ion abundance for at least one range of ion abundances.

9. The method of claim 8, wherein the range of trapping parameters is a first range of trapping parameters defining a first trapping regime in which the correction function has a first form and a second range of trapping parameters defines a second trapping regime in which the correction function has a second form, preferably wherein ions are more strongly trapped in the first trapping regime than in the second trapping regime;

wherein:

the first form of the correction function is different to the second form of the correction function; and/or the second form of the correction function is substantially linearly increasing with increasing ion abundance.

10. The method of claim 9, further comprising:

determining that the one or more trapping parameters associated with the mass spectral data and/or the mass spectral data are indicative of ions trapped in the second trapping regime; wherein determining the second form of the correction function for the mass spectral data based on: the one or more trapping parameters associated with the mass spectral data being indicative of ions trapped in the second trapping regime; and/or the mass spectral data being indicative of ions trapped in the second trapping regime.

11. The method of claim 9, wherein the correction function is based on total ion population, preferably wherein the second form of the correction function is based on total ion population.

12. The method of claim 1, wherein the correction function defines correction values for the mass spectral data for a first range of ion abundances and for a second range of ion abundances;

wherein a gradient of the correction function is substantially constant with respect to ion abundance for the first range of ion abundances and/or the second range of ion abundances, preferably wherein:

the correction function is substantially zero for the first range of ion abundances; and/or the correction function is non-zero for the second range of ion abundances.

13. The method of claim 12, wherein the correction function defines correction values for a third range of ion abundances, the third range of ion abundances being between the first range of ion abundances and the second range of ion abundances;

wherein a gradient of the correction function with respect to ion abundance is greater in the third range of ion abundances than in: the first range of ion abundances; and/or the second range of ion abundances;

preferably wherein the correction function is substantially linearly increasing with increasing ion abundance in the third range of ion abundances.

14. The method of claim 13, wherein the first range of ion abundances is lower than the second range of ion abundances and/or the third range of ion abundances.

15. The method of claim 1, wherein the correction function is any one or more of: a sigmoid fit; a logistic function fit; a polynomial fit; and a piecewise linear fit; preferably wherein the correction function is of the form $$f(x) = \frac{a}{1 + ce^{-dx-f}}$$

wherein f(x) is the correction value for an ion abundance of x and wherein a, c, d and f are fitting parameters.

16. The method of claim 1, wherein the correction function is monotonically non-decreasing with increasing ion abundance.

17. A mass spectrometry system comprising:

a time-of-flight mass spectrometer configured to provide mass spectral data obtained from a sample; and a correction unit configured to:

correct the mass spectral data using the method of claim 1.

18. A method for determining a correction function for mass spectral data, wherein the mass spectral data is time-of-flight mass spectral data, the method comprising:

receiving the mass spectral data obtained from a calibration sample, the mass spectral data being indicative of an ion abundance; and determining the correction function based on the ion abundance indicated by the mass spectral data and on one or more trapping parameters associated with the mass spectral data, the correction function defining correction values for the mass spectral data, for a range of ion abundances, and for a range of trapping parameters.

19. The method of claim 18, wherein determining the correction values comprises determining one or more differences between the mass spectral data and known mass spectral data for the calibration sample.

20. The method of claim 18, wherein determining the correction values for a given ion abundance and for given trapping parameters comprises determining one or more differences between: the mass spectral data obtained for the given ion abundance and for the given trapping parameters; and known mass spectral data for the calibration sample.

21. The method of claim 18, wherein the mass spectral data obtained from the calibration sample is obtained for a plurality of ion abundances and a plurality of trapping parameters.

22. The method of claim 18, wherein the correction function defines correction values for a range of charge states and the method further comprises:

determining a charge state of the mass spectral data; and determining the correction function for the mass spectral data based on the determined charge state.

* * * * *